United States Patent Office 3,403,597
Patented Oct. 1, 1968

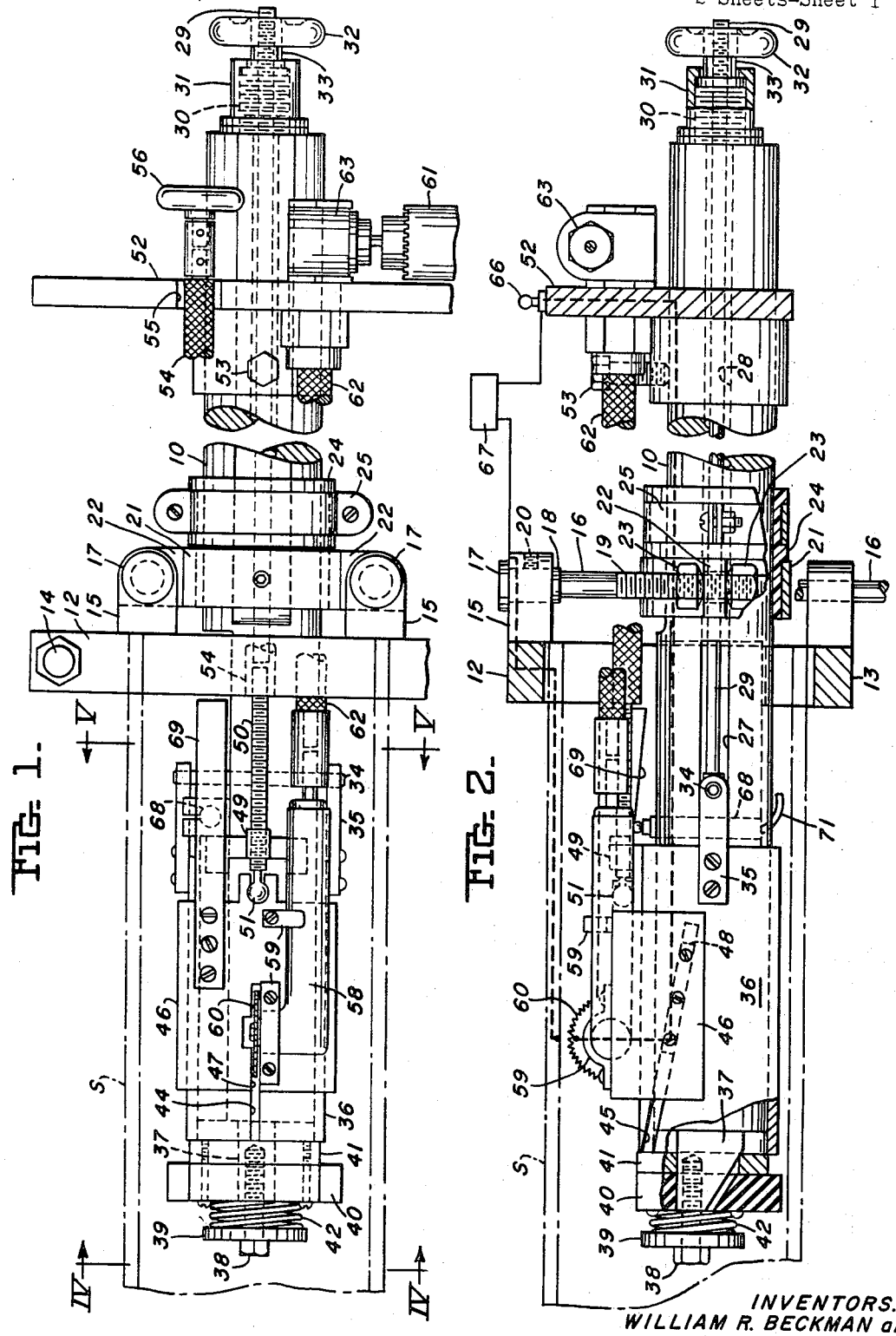

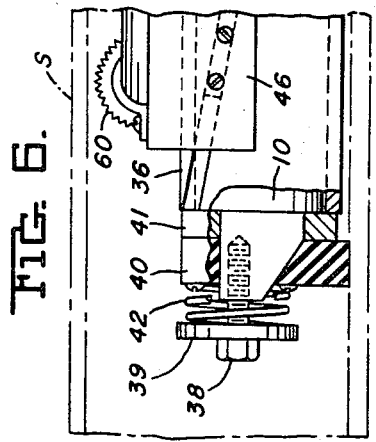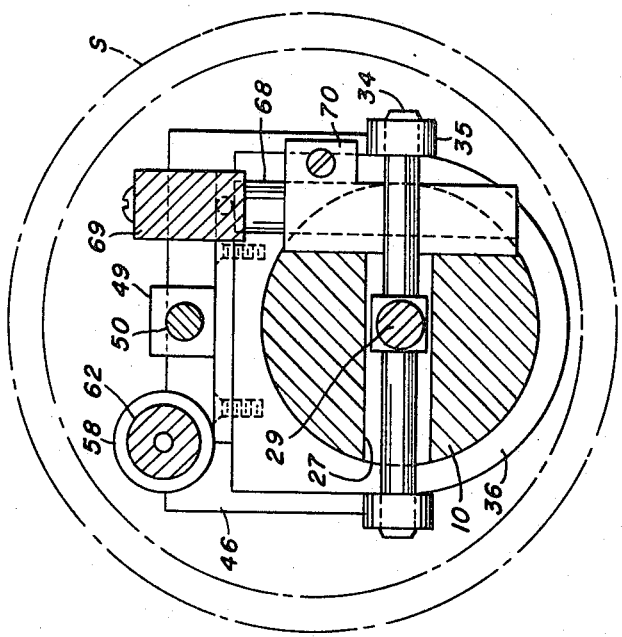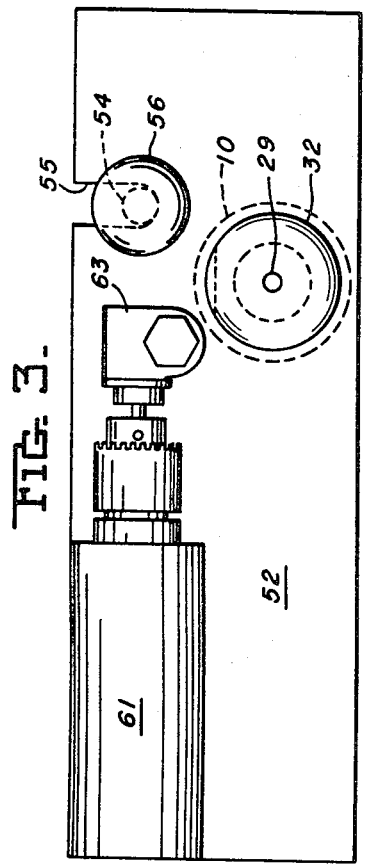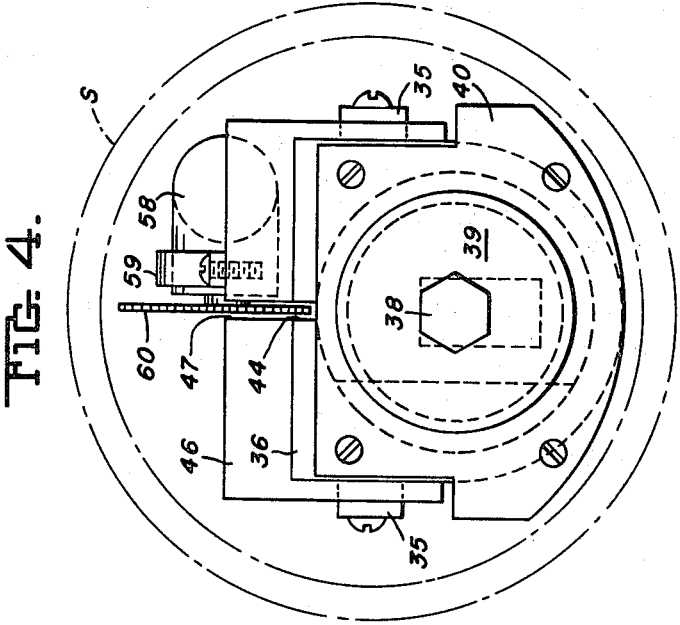

3,403,597
APPARATUS FOR CUTTING A GROOVE IN THE INSIDE SURFACE OF A PIPE
William R. Beckman, Elizabeth Township, Allegheny County, and James G. Dunn, White Oak Borough, Pa., assignors to United States Steel Corporation, a corporation of Delaware
Filed Nov. 17, 1966, Ser. No. 595,254
10 Claims. (Cl. 90—12)

ABSTRACT OF THE DISCLOSURE

Welded steel pipes are inspected for flaws by equipment which is calibrated against standard specimens. The standard specimen contains a simulated flaw of known dimensions. This disclosure relates to an apparatus for cutting a groove in the inside surface of a pipe to serve as a simulated flaw. The apparatus includes a motor-driven milling cutter mounted on a shaft which is clamped to the end of a pipe and extends inside. The shaft is supported so that it can be positioned parallel to the pipe wall, thus enabling the cutter to cut a groove of accurate length and depth, usually on the weld.

---

This invention relates to an improved apparatus for cutting a groove in the inside surface of a pipe or the like.

Although use of the apparatus is not thus limited, it has particular application for cutting simulated flaws in standard specimens used in calibrating flaw-detection equipment. Steel pipes manufactured by an electric resistance or flash-welding process commonly are inspected for flaws in the weld by ultrasonic or electromagnetic methods. Seamless pipes may also be inspected for flaws in the body by such methods. The flaw-detection equipment is calibrated against standard specimens which contain simulated flaws of known dimensions. In this manner the equipment furnishes an indication of the magnitude of flaws which it locates in pipes undergoing inspection. It has been difficult to produce simulated flaws, the dimensions of which have the required degree of accuracy, particularly on the inside surface of a tubular specimen.

An object of our invention is to provide a milling machine which can cut a groove of accurate dimensions on the inside surface of a tubular specimen or other pipe.

A further object is to provide an improved apparatus of the foregoing type which is of simple construction, usable with pipes of a wide diameter range, and requires no special skill to operate.

In the drawings:

FIGURE 1 is a top plan view of our apparatus positioned within a pipe;

FIGURE 2 is a side elevational view of the apparatus similarly positioned and with parts broken away;

FIGURE 3 is an end elevational view from the right of FIGURES 1 and 2;

FIGURE 4 is an end elevational view on a larger scale from the left of FIGURES 1 and 2 taken on line IV—IV of FIGURE 1;

FIGURE 5 is a vertical cross section on line V—V of FIGURE 1; and

FIGURE 6 is a fragmentary side elevational view showing the apparatus installed in the pipe.

The apparatus comprises an elongated shaft 10, which we clamp to the end of a pipe S with a portion extending inside the pipe electrically insulated therefrom. The clamp means includes upper and lower clamp bars 12 and 13 notched to receive the pipe and bolts 14 fixing the clamp bars to the pipe. Each clamp bar has a pair of opposed apertured lugs 15 within which we mount vertical rods 16 extending between the upper and lower bars. Each rod has a head 17 at its upper end, an enlargement 18 immediately below its head, and a threaded section 19 intermediate its length. The head rests on the lug 15 of the upper clamp bar 12 and the enlargement is received in the opening therein and held in place with a set screw 20. The rods support a collar 21 which has apertured radially-extending ears 22. The threaded sections 19 of the rods extend loosely through the ears, which are held in position by nuts 23 threadedly engaged with the rods. Within collar 21 we insert an insulator sleeve 24 which receives shaft 10. The end of the sleeve away from the collar is split. A split clamp 25 surrounds the split portion of the sleeve to grip the shaft.

Shaft 10 has an elongated transverse opening 27 inwardly of collar 21 and an axial bore 28 which extends from the outer end of the shaft to the opening 27. An axially movable pusher rod 29 extends through bore 28. The outer end of shaft 10 has a threaded boss 30 on which we mount a gland 31. The outer end of rod 29 lies outside gland 31 and carries a handwheel 32 threadedly engaged therewith. The handwheel is accessible from outside the pipe, and it carries a flanged nut 33 fixed to its inner face. The flange of nut 33 lies inside gland 31 to prevent axial movement of the handwheel with respect to shaft 10. The inner end of rod 29 lies within the transverse opening 27 and carries a transverse pin 34, the ends of which project outside the opening at both sides. A pair of plates 35 are attached to opposite ends of pin 34 and to a sleeve 36 which is slidable along shaft 10 in the axial direction. The inner end of shaft 10 has an integral boss 37, the bottom face of which forms an inclined plane. A bolt 38 is threaded into boss 37 and carries a retainer 39. We mount a shoe 40 and a supporting block 41 on boss 37 for sliding movement therealong. The shoe is of insulating material and is bolted to the block. The opening in the shoe which receives the boss is elongated vertically and its bottom face forms an inclined plane cooperable with that on the boss. The bottom face of the shoe is convex to engage the inside of the pipe. We use shoes of different sizes for pipes of different inside diameter. The shoe projects below the block to prevent electrical contact of the block with the pipe surface. A compression spring 42 encircles bolt 38 and bears at opposite ends against the retainer 39 and shoe 40.

The upper face of sleeve 36 is flat and has a slot 44 which extends from its inner end approximately half its length (FIGURE 4). The side faces have keyways 45 which slope downwardly from the upper inner corners (FIGURE 2). We mount a carriage 46 of inverted U-shape on top of the sleeve for movement therealong. The upper face of the carriage has a slot 47 directly above slot 44 in the sleeve (FIGURE 4). The inside faces of the vertical legs of the carriage have sloping keys 48 which ride in keyways 45; consequently when the carriage moves relative to the sleeve, its motion has a radial component which raises or lowers the carriage. The upper face of sleeve 36 carries a nut 49 (FIGURE 5). A spindle 50 is threadedly engaged with nut 49 and connected to the outer end of carriage 46 through a ball and socket joint 51 (FIGURE 1). Thus rotation of the spindle moves the carriage relatively to the sleeve, and the ball and socket joint permits the carriage to move vertically with respect to the spindle. The outer portion of shaft 10 carries a control panel 52 fixed thereto with a set screw 53. We attach a flexible shaft 54 to the end of spindle 50. The outer end of the flexible shaft extends through an opening 55 in the control panel and carries a second handwheel 56, which is accessible from outside the pipe (FIGURES 1 and 3).

We mount a conventional right angle drive 58 on the top of carriage 46 with clips 59 (FIGURES 1 and 4). The drive has a milling cutter 60, the lower portion of which lies within the aforementioned slots 44 and 47 in the sleeve and carriage. The control panel 52 carries a fractional horsepower motor 61, which we connect to the right-angle drive 58 through a flexible shaft 62 and gearing 63. We have not shown the right-angle drive, motor and gearing in detail, since they are well-known mechanisms available commercially.

Initially we insert shaft 10 in the pipe S and fix the clamp bars 12 and 13 to the pipe by tightening the nuts on bolts 14. We loosen clamp 25, whereby we can adjust the position of the shaft with respect to the clamp bars and pipe. When the pipe is welded and intended as a standard specimen for detecting flaws, we normally position the pipe so that the weld lies directly over the milling cutter 60. Before we insert the apparatus, we adjust the parts so that sleeve 36 is in its innermost position and spring 42 is fully compressed, as FIGURE 1 shows. Carriage 46 is in a lowered position with respect to the sleeve. We turn the first handwheel 32 clockwise (if the threads are right hand), whereby spring 42 forces spindle 29, sleeve 36, shoe 40 and parts carried thereon outwardly or to the right, as viewed in FIGURES 1 and 2. The flexible shafts 54 and 62 bend to allow the necessary movement. The convex bottom face of shoe 40 rests on the inside face of the pipe. As the shoe moves along the inclined plane on boss 37, the inner end of shaft 10 is lifted. We continue turning the handwheel clockwise until the block 41 abuts the shoulder formed by the end of shaft 10 and the block seats on the boss 37, as FIGURE 6 shows. This places the edge of the milling cutter 60 about 3/32 inch from the surface of the pipe. We then tighten the split clamp 25 to hold shaft 10 against axial movement with respect to the pipe.

Next we start motor 61 to drive the milling cutter 60. We turn the second handwheel 56 clockwise (if the threads are right hand) to raise the carriage 46 with respect to sleeve 36 until the rotating cutter contacts the surface of pipe S. The apparatus includes a signal lamp 66 visible from outside the pipe to indicate when such contact is made (FIGURE 2). We connect this lamp in series with a power source 67 to one of the clamp bars 12 or 13 and to shaft 10, whereby contact of the cutter with the pipe completes the circuit. As already pointed out, sleeve 24 and shoe 40 are of insulating material, thus preventing completion of the circuit otherwise. As a means for subsequently determining the position of the cutter, the apparatus includes an air gage 68 fixed with respect to sleeve 36 and a cooperating gage follower 69 fixed with respect to carriage 46 (FIGURES 1, 2 and 5). The inside face of the sleeve carries a guide 70 in which gage 68 is mounted. Shaft 10 is recessed along one side to accommodate the gage and guide. We bolt the follower 69 directly to the top of the carriage. Its bottom face forms an inclined plane parallel with the keyways 45. A tubing 71 connects the gage to an indicator dial, not shown but visible from outside the pipe. The gage per se is a known item, available commercially; hence we have not shown it in detail. We note the gage reading when lamp 66 lights, and then turn the second handwheel 56 counterclockwise to retract the cutter.

Next we turn the first handwheel 32 clockwise to move sleeve 36 and the parts carried thereby outwardly a given distance along shaft 10 (for example 2 inches). We again turn the second handwheel 56 clockwise to raise the cutter until once more it contacts the inside surface of the pipe. When lamp 66 again lights, we note the reading on gage 68. If shaft 10 is positioned properly with respect to the pipe, this reading is the same as the first reading. If not, we adjust the position of the shaft by turning nuts 23. We repeat the foregoing steps until the two readings are the same, whereby we position shaft 10 so that its axis is exactly parallel with the pipe wall.

Next we turn the first handwheel 32 counterclockwise to move sleeve 36 back to the position where we took the first gage reading. We turn the second handwheel 56 clockwise to feed the cutter 60 into the pipe wall and cut a groove of the desired depth, as indicated by the gage reading. Thereafter we turn the first handwheel 32 clockwise to feed the cutter axially of the pipe wall for a distance to cut a groove of the desired length. The depth is uniform over the entire length, since we set up the apparatus initially with the axis of shaft 10 parallel with the pipe wall. Finally we stop the motor, retract the cutter, and remove the apparatus from the pipe.

From the foregoing description it is seen that our invention affords a simple apparatus which cuts an accurately dimensioned groove along the inside surface of a pipe wall. The cutter can be exceedingly thin to produce a groove which simulates flaws actually encountered in the weld of a welded pipe. In this manner we produce a standard specimen for calibrating the flaw-detection equipment.

While we have shown and described only a single embodiment of our invention, it is apparent that modifications may arise. Therefore, we do not wish to be limited to the disclosure set forth but only by the scope of the appended claims.

We claim:
1. An apparatus for cutting a groove of predetermined depth and length in the inside surface of a pipe, said apparatus comprising a shaft, clamp means connected with said shaft for mounting the shaft on the end of a pipe with a portion of the shaft extending inside the pipe, a sleeve carried by the portion of said shaft within the pipe for axial movement along the shaft, a carriage mounted on said sleeve for radial movement with respect to said shaft, a milling cutter mounted on said carriage engageable with the inside surface of the pipe, drive means operatively connected with said cutter, means accessible from outside the pipe and operatively connected with said sleeve and said carriage for moving the sleeve axially of the shaft and moving the carriage and cutter radially of the shaft, and indicating means operatively connected with said carriage and visible from outside the pipe to show the relative position of said cutter.

2. An apparatus as defined in claim 1 in which said clamp means includes a pair of opposed clamp bars notched to receive the pipe, bolts connecting said clamp bars, said bars having apertured lugs, a pair of rods extending through said lugs and having threaded portions intermediate their length, a collar mounted on said rods, an insulating sleeve within said collar receiving said shaft and having a split portion, a split clamp around said split portion, and nuts threadedly engaged with said threaded portion and abutting said collar for adjusting the position of said shaft with respect to the pipe.

3. An apparatus as defined in claim 1 further comprising means carried by the end of said shaft within the pipe engageable with the pipe wall for supporting the pipe in cooperation with said clamp means.

4. An apparatus as defined in claim 3 in which the means carried by the end of said shaft within the pipe comprises a boss on the end of said shaft, a shoe supported on said boss for movement therealong, said boss and said shoe having cooperating inclined planes for moving the shoe into engagement with the pipe wall as it moves along the boss, said sleeve being adapted to hold said shoe in a position away from the pipe wall, and spring means urging said shoe toward said sleeve.

5. An apparatus as defined in claim 1 in which said shaft has an elongated transverse opening in the portion within the pipe and an axial bore extending from its outer end into said opening, and the means for moving said sleeve includes a rod extending through said bore and connected to said sleeve through said opening, and a handwheel threadedly engaged with said rod at the end of said shaft.

6. An apparatus as defined in claim 1 in which said sleeve and said carriage have cooperating keyways and keys sloping from corners of said sleeve whereby movement of the carriage along the sleeve provides said radial movement.

7. An apparatus as defined in claim 6 in which the means for moving said carriage includes a nut carried by said sleeve, a spindle threadedly engaging said nut, a ball and socket joint connecting said spindle and said carriage permitting relative radial movement therebetween, a flexible shaft connected to said spindle and a handwheel carried by the end of said flexible shaft outside the pipe.

8. An apparatus as defined in claim 1 in which said drive means includes a right-angle drive mounted on said carriage and connected to said cutter, a control panel mounted on said shaft outside the pipe, a fractional horsepower motor mounted on said panel, and a flexible shaft connecting said motor and said right-angle drive.

9. An apparatus as defined in claim 1 in which said shaft is electrically insulated from the pipe, and said indicating means includes a lamp and a power source connected in series with said shaft and pipe, whereby the circuit is completed to energize said lamp when said cutter contacts the pipe.

10. An apparatus as defined in claim 8 in which said indicating means further includes an air gage fixed with respect to said sleeve and a cooperating follower fixed with respect to said carriage and engaging said gage.

References Cited

UNITED STATES PATENTS

| | | | |
|---|---|---|---|
| 543,309 | 7/1895 | Lake | 90—12 |
| 3,067,651 | 12/1962 | Hogden et al. | 90—12 |

GERALD A. DOST, *Primary Examiner.*